Dec. 9, 1930. H. S. GEORGE 1,784,425
ILLUMINATION FOR MICROSCOPY
Filed June 30, 1924
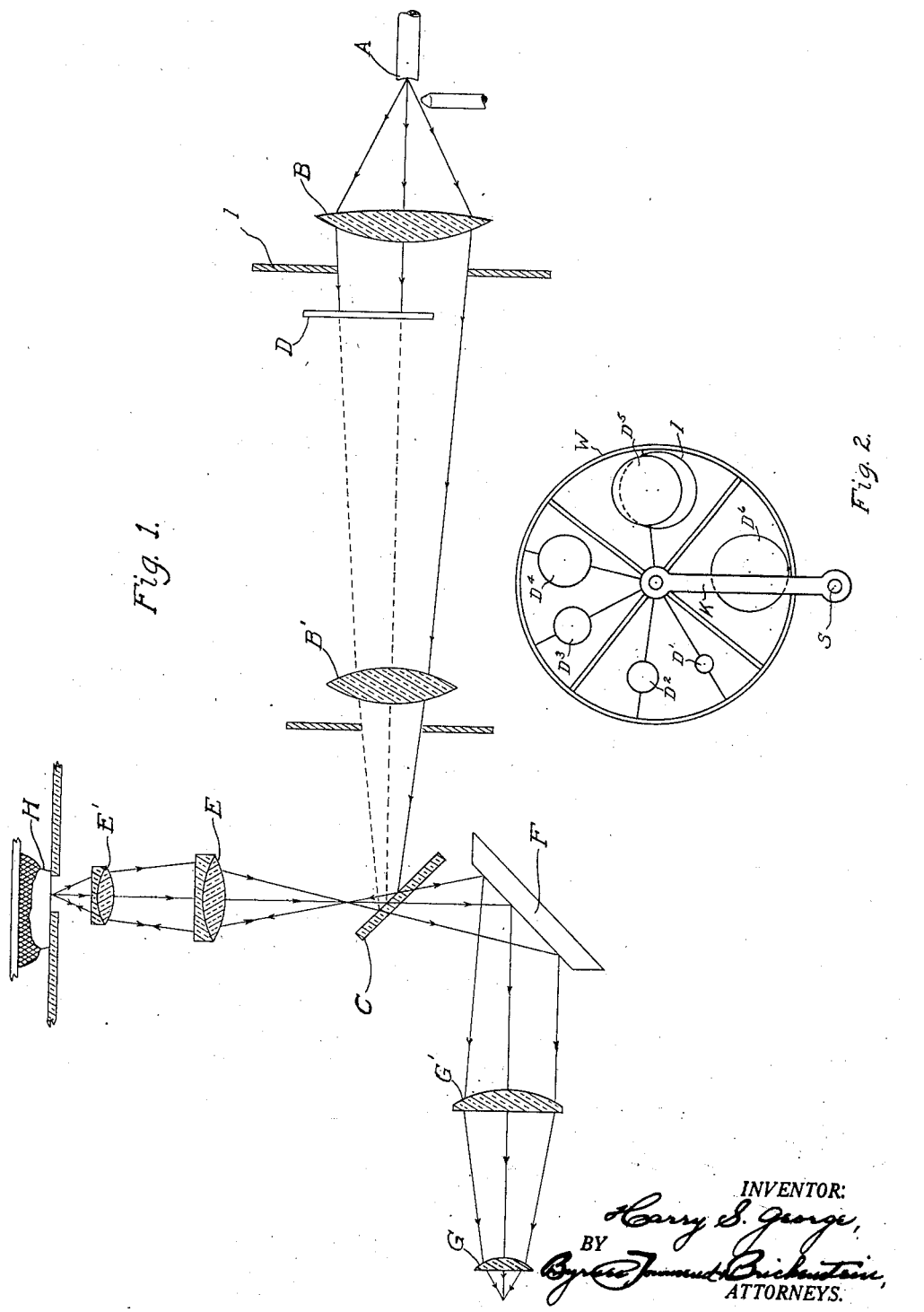

Patented Dec. 9, 1930

1,784,425

UNITED STATES PATENT OFFICE

HARRY S. GEORGE, OF MASSAPEQUA, NEW YORK, ASSIGNOR TO ELECTRO METALLURGICAL COMPANY, A CORPORATION OF WEST VIRGINIA

ILLUMINATION FOR MICROSCOPY

Application filed June 30, 1924. Serial No. 723,396.

The invention relates to the illumination of objects for the purpose of microscopic examination including photomicrography, and comprises improvements in processes and apparatus for the microscopic examination of opaque objects by reflected light. An important field of application of the invention is in metallography.

There are two kinds of illumination now employed in such work and these are generally designated as reflected oblique illumination and reflected vertical illumination. In the former method the light which falls on the object comes from a source at one side of the objective of the microscope and does not pass through the objective until after it strikes the object. While this method is not lacking in utility, the illuminating rays necessarily strike the surface to be examined at an angle so acute that all details of the surface are not revealed, and an unnatural appearance which can be interpreted only by those who have had long experience with the method is imparted to the object. Furthermore, the method is not applicable where to secure high magnification it is necessary that the objective be very close to the object.

For examinations at high magnification, vertical illumination is therefore universally employed. This method likewise has a serious defect. Whereas with oblique illumination the shadows of elevations on the surface may be so elongated that details of the surface beyond the elevations are not revealed, with vertical illumination there are no shadows because of the great intensity of the light which passes to the object in lines normal to its surface. The insufficiency of vertical illumination to reveal to the best advantage all details of the surface will be apparent when it is considered that by this method it is impossible positively to distinguish an area in the plane of the surface under examination and bounded by a fine line, from a depression having a flat bottom and more or less vertical walls, or from a plateau bounded by vertical surfaces.

In the method of my invention, light passes through the objective to the object and is reflected therefrom through the objective and eventually to the eye of the observer, all as in the usual method of vertical illumination. The distinguishing feature of my invention consists in eliminating from the light falling on the object rays which travel parallel or approximately parallel to the axis of the objective and hence normal to the surface under examination, so that the light from this direction is rendered less intense than light which falls on the object in an oblique direction. This oblique light is, however, much more nearly normal to the surface under examination than in the method of oblique illumination as now practised. As already stated, the method of my invention may be employed with high magnification where the present method of oblique illumination cannot be used.

The invention is illustrated in the annexed drawing, in which

Fig. 1 shows the light paths through a metallographic microscope when an object is examined by vertical illumination in accordance with my invention.

Fig. 2 is an arrangement of apparatus whereby opaque discs of various sizes can be introduced in turn into the light paths of the system, and placed in various positions with respect to the axis of the optical system.

In the usual system of so-called vertical illumination, the light which falls on the object includes oblique as well as vertical rays. The eclipse of the oblique rays by irregularities on the surface produces no shadows because the vertical rays reach all parts of the field and are sufficiently intense to illuminate it throughout. Therefore the elevations or depressions of the object do not appear in relief, but seem to lie in the plane of the surface.

In Fig. 1 is shown an optical system comprising a source of light A, condensers B and B′, a partial reflector C, objective E, E′, reflector F, eye piece G, G′ and a diaphragm I, preferably of the iris type. The material to be examined is placed at H and an opaque disc D is so placed that it stops out the vertical rays and also those which are nearly vertical. Oblique rays from one direction are also removed. If the disc is circular and is placed as shown in Figs. 1 and 2, the beam of light beyond the disc will be crescent-shaped in cross-section, and the optical axis of the system will not intersect this crescent except at focal points. Since little or no light will fall vertically upon the object, a shadow will appear beside each elevation and on the side or bottom of each depression, rounded surfaces will be shaded, and the details of the object will appear in relief. The difference in appearance of an object when vertically illuminated and when illuminated in accordance with my invention is generally similar to the difference in the appearance of the ground to an aeronautical observer at noon, when no shadows are visible, and in the morning or afternoon.

In order that details of the surface may be revealed to the fullest extent possible, it is often desirable that the object be examined with the light coming from various directions in turn, and with varying total illumination, and various relations of oblique to vertical light. This can be accomplished by changing the position of the opaque disc with respect to the optical axis of the system, along which the vertical rays travel, and by using discs of different sizes. Various mechanical devices will permit these changes to be made readily, and in Fig. 2 I have shown a simple device for this purpose. In this device a skeleton wheel W is journaled in one end of an arm K, capable of revolving about a fixed stud S. The friction between stud S and the opening provided for it in arm K is sufficient to maintain arm K in any adjusted position. The wheel W carries opaque discs $D^1$, $D^2$, $D^3$, $D^4$, $D^5$ and $D^6$, which are of various sizes and supported by radially extending wires. This wheel is placed before the iris diaphragm I in such a way that the discs can be successively brought into the light beam. By rotating wheel W a disc is moved across the iris in one direction, and by revolving arm A about stud S the disc can be moved across the iris in a substantially perpendicular direction, so that the disc can be placed in any desired position with respect to the iris.

A single view of a surface illuminated in accordance with my invention gives much more information as to its nature than can be obtained with present methods of illumination, and by viewing the surface again with illumination of different intensity or from a different direction, further information can usually be obtained. Under some circumstances it is also useful to view the surface with only the vertical rays stopped out, and with oblique light falling on the surface from all directions. To secure this effect the opaque disc is placed centrally with respect to the iris.

It will be apparent that the great variety of microscopes of the kind described precludes the giving of specific directions for the proper adjustment of all of them for use in connection with my invention. Even with a single type of microscope variations in focal length of the individual condensers will affect the necessary adjustments, and it is therefore manifestly impracticable to describe the adjustments specifically. The device shown in Fig. 2, while satisfactory for certain types of microscopes, will need to be modified for others, but the principle of the invention is applicable to all types where the object is illuminated through the objective itself.

The optical arrangements should be such that when only a fringe or small portion of the outer rays in the light beam are allowed to pass, the object will still be illuminated evenly. When the apparatus is improperly adjusted, a dark spot or shadow is cast over the field. By optical adjustments is meant the relative positions of the various condensers in the system, the point along the light beam at which the axial rays are eliminated, the extent to which the axial rays are eliminated, the adjustment of iris diaphragms, and the like. The adjustments of condensers, iris diaphragms, etc. in a microscope arranged for practising my invention, may or may not coincide with the proper adjustments when the instrument is used in the usual way.

The invention is applicable to all types and powers of objectives, but its advantages are emphasized when objectives of high numerical aperture are used. When ordinary vertical illumination is used the obliquity of the outer rays of the cone between the objective and the object increases with the numerical aperture of the objective. These highly oblique rays are very suitable for illuminating the object when the axial rays have been sufficiently reduced in intensity in accordance with my invention.

As will be readily understood by those skilled in the art, microscopes of the kind under consideration include a means for turning the beam of light from the illuminant into such a direction that it will pass through the objective. For example, a prism, a silvered half-mirror or a plain glass disc may be used for this purpose. The plain glass disc reflector is especially adapted for use in connection with my invention, and is preferred. An arc is preferred as the light source since it most nearly approximates a point source of light.

Between various types of optical trains, I prefer to use one utilizing an adjustable independently mounted supplementary condenser, situated between the illuminant condenser and the so-called vertical condenser. This admits of placing the apparatus of my invention in the preferred position, namely, between the illuminator condenser and the usual ray-filter. In this position, control of the size and shape of the light beam is facilitated by noting its configuration on the light filter.

In addition to the advantages already referred to, the following may be noted: An increase in optical resolution is attained on account of the fact that the extreme peripheral rays are used,—that is, the full numerical aperture of the objective lens is utilized. In the methods employed heretofore, it is customary to stop down the value of the numerical aperture by iris diaphragms for optical considerations, whereas in my invention there is no necessity for this and the full aperture is retained. For similar reasons, when the invention is used in connection with photomicrography, the time of exposure may be considerably reduced over the exposure which is necessary in methods now employed.

I have illustrated the use of an opaque disc of circular contour to stop out the axial light rays, but stops of other configuration may be used. The beam of light used for illumination may be for example a segment of a circle instead of a crescent, the boundary of the stop being a straight line instead of a curve. An approximately circular stop is preferred, however, since light from the cusps of the crescent may be made to serve the same purpose as diffused light in ordinary illumination, preventing a too contrasty appearance of the object. A circular stop also has the advantage that by revolving it around the periphery of the iris, the direction of illumination can more readily be changed without changing the total illumination or the cross-section of the illuminating beam. Oblique light which is not too nearly unidirectional can also be obtained by having the portion of the stop which projects before the iris bounded by a curve other than a circle, or angular.

Although a specific and preferred form of apparatus is described for accomplishing the elimination or reduction of intensity of the axial rays relative to the oblique rays, and of making the light from any direction predominate, yet it is not desired to limit the invention to a particular form of apparatus inasmuch as the broad invention resides in a method of and means for suppressing the deleterious effect of axial rays on the image.

I claim:—

1. Method of illuminating opaque objects for microscopic examination which comprises causing a beam of light to pass through the objective of the microscope in such manner that the light rays will be caused to converge on the object, and stopping out of the beam light rays which would otherwise fall vertically on the object.

2. Method according to claim 1 in which a portion of the light rays which would otherwise fall obliquely on the object are also stopped out.

3. Method of examining opaque objects having slight relief microscopically which comprises viewing the object with a beam of light converging thereon from the objective of the microscope, the rays from one oblique direction being of greater intensity than the vertical rays whereby shadows are formed on said object, then causing rays from another oblique direction to assume the greatest intensity whereby different shadows are formed on said object and again viewing the object.

4. Apparatus for examining opaque objects microscopically which comprises a microscope, a light source, means to cause a beam of light from the source to pass through the objective of the microscope and converge therefrom on the object, and a stop between said light source and said objective for removing from the light beam rays which would otherwise fall on the object, while permitting other rays to pass and fall on the object, said stop being adjustable in at least two dimensions of space.

5. Apparatus for examining opaque objects microscopically which comprises a microscope, a light source, means to cause a beam of light from the source to pass through the objective of the microscope and converge therefrom on the object, and a stop between said light source and said objective for removing from the light beams rays which would otherwise fall vertically on the object and for removing a portion of the rays which would otherwise fall obliquely on the object while permitting other rays to pass and fall obliquely on the object.

6. Apparatus for examining opaque objects microscopically which comprises a microscope, a light source, means to cause a beam of light from the source to fall on the objective of the microscope and converge therefrom on the object, a stop between said light source and said objective for removing from the light beam rays which would otherwise fall vertically on the object and for removing a portion of the rays which would otherwise fall obliquely on the object while permitting other rays to pass and fall obliquely on the object, and means for adjusting said stop to change the direction from which light falls obliquely on the object.

7. Apparatus for examining opaque objects microscopically which comprises a microscope, a light source, means to cause a beam of light from the source to pass through the objective of the microscope and converge therefrom on the object, said means comprising a disk illuminator, and a stop positioned between said disk and the light source and adapted to remove from the light beam rays which would otherwise fall vertically on the object and to remove a portion of the rays which would otherwise fall obliquely on the object while permitting other rays to pass and fall obliquely on the object.

8. In a microscope for examining opaque objects including an objective and a stage, means for passing a converging conical beam of light through said objective onto an object on said stage including means for modifying said beam of light so that the axial rays are of less intensity than the oblique rays.

9. A microscope for examining opaque objects comprising an objective, a stage, means for passing a converging conical beam of light through said objective onto an object on said stage including means for so modifying the beam of light that the axial rays are insufficient in intensity to prevent shadows from being cast by elevations on the object.

10. Method of illuminating opaque objects for microscopic examination which comprises passing to the object and through the objective of the microscope a convergent beam of light of crescent shaped cross section.

11. Method of examining opaque objects microscopically which comprises viewing the object with a beam of crescent shaped cross section converging therefrom from the objective of a microscope, rotating the beam of light about the center of the objective and again viewing the object.

12. Apparatus for examining opaque objects microscopically which comprises a microscope, a light source, means to cause a beam of light from the source to pass through the objective of the microscope and converge on the object, and means between the light source and the objective to give the beam of light a crescent shaped cross section.

13. Method of illuminating opaque objects for microscopic examination which comprises passing to the object and through the objective a convergent beam of light in which the axial rays are of less intensity than the oblique rays and in which the oblique rays from one direction preponderate for the purpose of securing a relief effect, said beam also including oblique rays spaced at least 90° from the point of greatest intensity.

14. Method of examining opaque objects microscopically which comprises the step of viewing the object with a converging beam of light passing through the objective and having the axial rays of less intensity than the oblique rays, the oblique rays from one direction preponderating, said beam including same oblique rays spaced more than 90° from the point of greatest intensity, then causing the oblique rays from another direction to assume the greatest intensity and again viewing the object.

15. A microscope for examining opaque objects comprising an objective, a stage, means for passing a beam of light through said objective onto an opaque object on said stage in such a manner that the rays will converge on said object, and means for modifying said beam of light comprising a diaphragm and a stop, said stop extending beyond the center of the light beam passed by said diaphragm but obstructing substantially less than 180° of the circumference thereof.

16. Method of illuminating opaque objects for microscopic study which comprises causing a beam of light to pass through the objective of the microscope in such a manner that the light rays will be caused to converge on the object, and eliminating from the beam those light rays which would otherwise fall vertically on the object.

In testimony whereof, I affix my signature.

HARRY S. GEORGE.